(12) United States Patent
Sasso et al.

(10) Patent No.: US 8,588,107 B2
(45) Date of Patent: *Nov. 19, 2013

(54) RETURNING DOMAIN IDENTIFICATIONS WITHOUT RECONFIGURATION

(75) Inventors: Christian Sasso, Milpitas, CA (US);
Siddharth Kasat, Santa Clara, CA (US);
Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 13/324,588

(22) Filed: Dec. 13, 2011

(65) Prior Publication Data

US 2012/0082155 A1    Apr. 5, 2012

Related U.S. Application Data

(63) Continuation of application No. 12/039,455, filed on Feb. 28, 2008, now Pat. No. 8,085,687.

(51) Int. Cl.
*H04L 12/28* (2006.01)
*H04L 12/24* (2006.01)

(52) U.S. Cl.
CPC ..................................... *H04L 41/12* (2013.01)
USPC ....................................................... 370/254

(58) Field of Classification Search
CPC ........................ H04L 29/08549; H04L 49/357
See application file for complete search history.

(56) References Cited

U.S. PATENT DOCUMENTS

| | | | |
|---|---|---|---|
| 6,014,715 A | 1/2000 | Stoevhase | |
| 7,230,929 B2 | 6/2007 | Betker et al. | |
| 7,499,410 B2 | 3/2009 | Dutt et al. | |
| 7,548,924 B2 * | 6/2009 | Watanabe | 1/1 |
| 7,565,698 B2 | 7/2009 | Isozaki et al. | |
| 2002/0133552 A1 | 9/2002 | Ooi et al. | |
| 2004/0010624 A1 | 1/2004 | Garofalo et al. | |
| 2005/0118987 A1 * | 6/2005 | Isozaki et al. | 455/412.1 |
| 2006/0034167 A1 | 2/2006 | Grice et al. | |
| 2006/0047907 A1 | 3/2006 | Shiga et al. | |
| 2007/0052620 A1 | 3/2007 | Lin et al. | |
| 2007/0223681 A1 | 9/2007 | Walden et al. | |
| 2008/0010605 A1 | 1/2008 | Frank | |
| 2008/0028450 A1 * | 1/2008 | Zhao et al. | 726/6 |

* cited by examiner

*Primary Examiner* — Huy D Vu
*Assistant Examiner* — Joseph Bednash
(74) *Attorney, Agent, or Firm* — Patterson & Sheridan, LLP

(57) ABSTRACT

In one embodiment, a technique for returning Domain IDs to a Fiber Channel fabric without a full build fabric (BF) phase is provided. A switch in the fabric may send a principal switch a message requesting the return of one or more Domain IDs assigned to that device. The principal switch may update the list of fabric Domain IDs to remove the Domain IDs identified in the message and send the updated list to devices in the fabric.

20 Claims, 5 Drawing Sheets

RETURNING DOMAIN IDENTIFICATIONS WITHOUT RECONFIGURATION

CROSS-REFERENCE TO RELATED APPLICATIONS

This application is a continuation of co-pending U.S. patent application Ser. No. 12/039,455, filed on Feb. 28, 2008, and which is incorporated herein by reference in its entirety.

BACKGROUND OF THE INVENTION

1. Field of the Invention

Embodiments of the present disclosure generally relate to networks and, more particularly, to Fibre Channel network fabrics.

2. Description of the Related Art

The Fibre Channel standard addresses the general need in networking for very fast transfers of large amounts of information. Fibre Channel networks utilize an arrangement of switches, called a Fabric, to connect devices. This approach simplifies the overhead associated with network traffic, as a device with a Fibre Channel port need only manage a point-to-point connection between its port and the Fabric.

To eliminate ambiguity when routing traffic between switches in a fabric, each switch in a Fabric is assigned one or more unique Domain_IDs during a multi-phase process. In a first phase, one switch in the fabric is selected as a Principal Switch. The Principal Switch then assigns Domain_IDs to the other switches of the Fabric in a second phase. For some applications, such as virtual storage area network (VSAN) applications, a single switch may have multiple assigned Domain_IDs, including virtual Domain_IDs.

In some cases, it may be desirable for a switch to return a Domain_ID. For example, there may be a limited number of Domain_IDs available and returning a Domain_ID may allow that Domain_ID to be re-assigned to a different device, thereby preserving Domain_IDs while still maintaining uniqueness. Another situation where it can be useful to release a Domain_ID is when all the devices associated with it have been freed. Unfortunately, in conventional systems, re-assigning Domain_IDs typically requires a lengthy reconfiguration process that involves flooding the network with frames that may disrupt device operation.

Accordingly, what is needed is an improved technique for returning Domain_IDs.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure may reduce the time required for returning domain IDs assigned to devices in a Fibre Channel fabric in comparison to conventional networks that would require a reconfiguration process. By supporting messages that allow subordinate switches to request the return of domain IDs assigned to them, previously assigned domain IDs may be returned (for later reassignment while maintaining uniqueness) without a lengthy fabric rebuild. In addition to saving time, avoiding a fabric rebuild may prevent the associated flooding of frames through the network which may contribute to excessive device loading and a resulting unrecoverable state.

One environment that provides a useful application of the techniques presented herein is a virtual storage area network (VSAN) where the domain ID list includes virtual domain IDs. The techniques presented herein provide a great deal of flexibility in administering a VSAN by allowing virtual domain IDs to be removed from the fabric domain ID list without the necessity for a lengthy re-build fabric phase.

As used herein, the term fabric generally refers to an arrangement of one or more interconnected switches that connect devices in a network. As used herein, the term Principal Switch generally refers to a switch in a Fibre Channel fabric that assigns Domain_IDs to other switches in the same fabric.

Embodiments of the present disclosure are described below with reference to returning domain IDs in Fibre Channel fabrics. However, those skilled in the art will appreciate that the techniques described herein may also be more generally applied during a variety of different types of events that alter or reconfigure a fabric, such as re-booting a switch, reconfiguring a switch or any type of event in which domain IDs may be recovered and/or reassigned.

An Exemplary Network Environment

Figure 1:
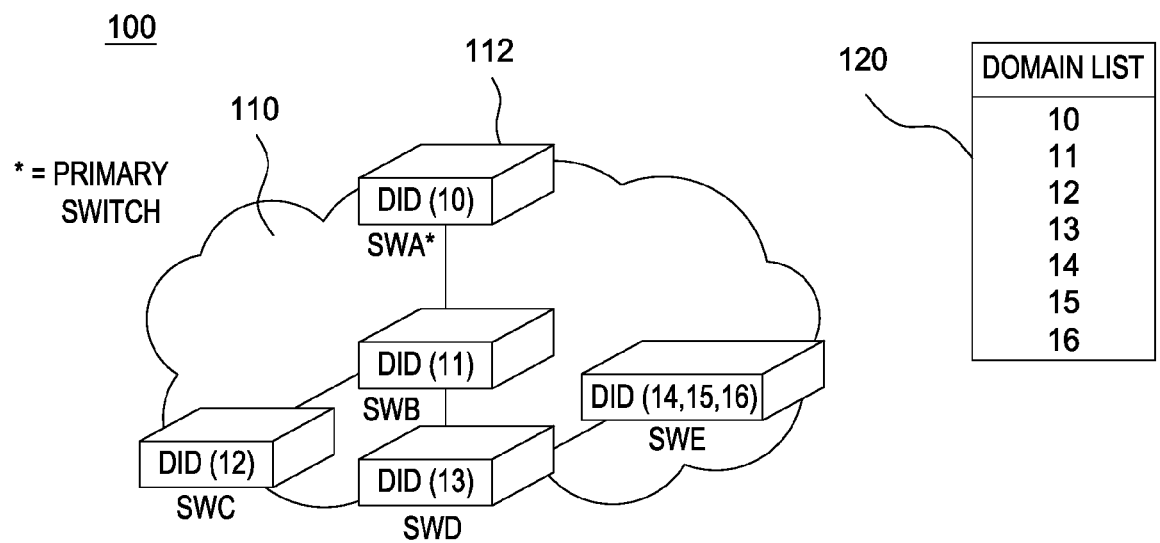
FIG. 1 illustrates an example of a Fibre Channel network in which embodiments of the present disclosure may be practiced.

FIG. 1 illustrates one example of a network environment 100, in which embodiments of the present disclosure may be utilized. As illustrated, the network 100 includes a fabric 110. While the fabric may be formed by a relatively large number of different types of network elements, to simplify the illustrated example, each fabric is shown with a relatively small number of switches 112.

The example fabric 110 has five switches, Switch A, Switch B, Switch C, Switch D, and Switch E, with unique Domain_IDs 10, 11, 12, 13, and 14-16 respectively. Switch A is designated as the Principal Switch for the fabric and Switches B-E are subordinate switches. Each switch may keep a local copy of a fabric Domain_ID list 120, typically broadcast by the principal switch after having assigned a domain.

As previously described, it may be desirable to allow subordinate switches to return Domain_IDs, for example, to free up those Domain_IDs to be reassigned to other switches. According to embodiments of the present disclosure, Domain_IDs may be returned without a lengthy reconfiguration process involving a (re)build fabric (BF) phase. For some embodiments, a subordinate switch may be able to request the removal of Domain_IDs assigned to that switch via a message sent to the primary switch. In response, the primary switch may acknowledge acceptance of the request with a response message and send an updated Domain_ID list to all devices in the fabric.

Any suitable mechanism may be used to request removal of a set of one or more Domain_IDs assigned to a switch. For some embodiments, a special message may be provided for the specific purpose of returning Domain_IDs. For other embodiments, however, an existing message may be utilized to request removal of Domain_IDs.

For example, a Request Domain Identifier (RDI) message commonly used to request specified Domain IDs be assigned to a switch may be manipulated to instead request removal of specified Domain_IDs. Conventional RDI messages may recognize only a limited range of values as valid Domain_IDs in a request. However, a "reverse" RDI message may include a ("trigger") value outside of this range as an indicator that the message is requesting removal of a list of Domain_IDs to follow. For example, assuming valid Domain_IDs in a range from 1-239, a trigger value of "0" or "240" may be used as an indicator. To facilitate understanding, the following description will assume the use of such a reverse RDI (RRDI) as the mechanism to request removal of Domain_IDs.

Figure 2:
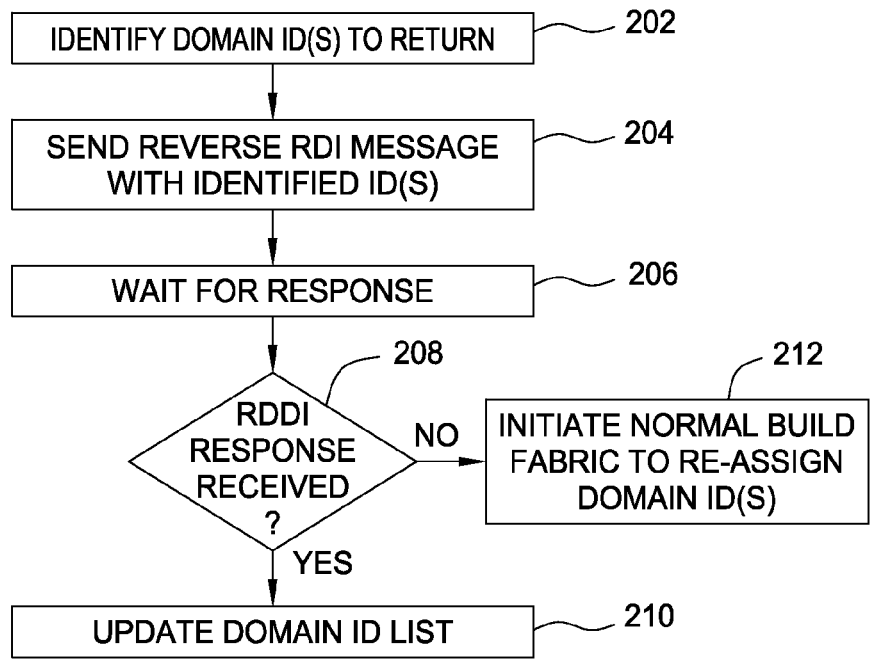
FIG. 2 is a flow diagram of example operations that may be performed by a subordinate switch for returning domain IDs in accordance with embodiments of the present disclosure.

FIG. 2 illustrates example operations 200 that may be performed, for example by a subordinate switch in a fabric, to return Domain_IDs. The operations begin, at 202, by identifying one or more Domain_IDs to return. At 204, the switch sends an RRDI message specifying the Domain_IDs to be returned and waits for an RRDI response from the primary switch, at 206.

If an RRDI response is received, at 208, the requesting switch updates its Domain_ID list to remove the returned Domain IDs. For some embodiments, the primary switch may not send an explicit RRDI response but, rather, may indicate acceptance of the request by sending a new Domain_ID list to all the switches in the fabric with the specified Domain_IDs removed.

As illustrated, if an RRDI response (or new Domain_ID list) is not received, the switch may initiate a normal Build Fabric (BF) phase, at 212. In other words, the requesting switch may still return Domain_IDs even if the principal switch does not support Domain_ID removal without reconfiguration. Thus, even if the principal switch does not support Domain_ID removal without reconfiguration, a subordinate switch may still operate properly, by regressing to conventional reconfiguration operations.

Figure 3:
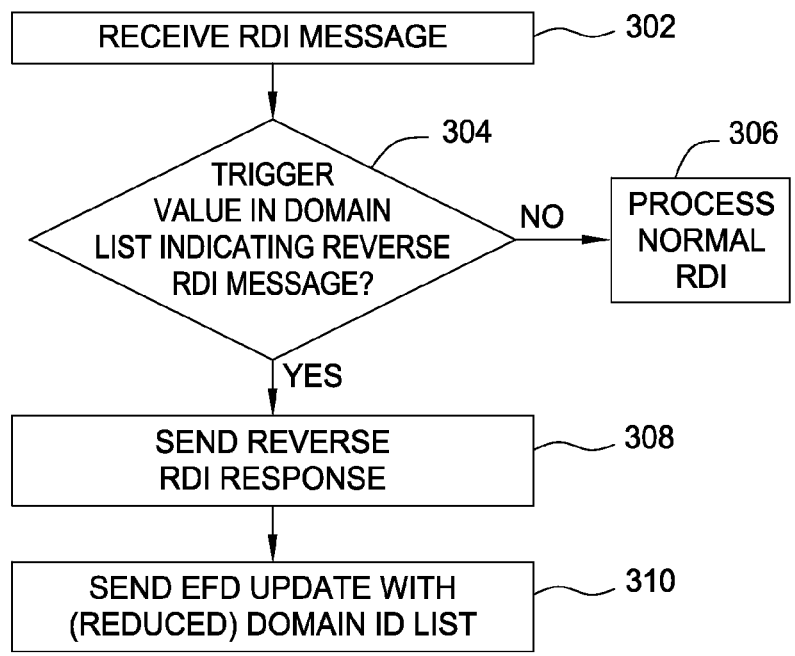
FIG. 3 is a flow diagram of example operations that may be performed by a principal switch for returning domain IDs in accordance with embodiments of the present disclosure.

FIG. 3 illustrates example operations 300 that may be performed by the principal switch to return Domain_IDs (e.g., in response to operations 200 performed by the subordinate switch). The operations 300 may be described with reference to FIGS. 4A-4D which illustrate message flow during Domain_ID return operations according to embodiments of the present invention.

The operations begin, at 302, by receiving an RDI message. If the RDI message does not include a trigger value indicating a "reverse" RDI message, as determined at 304, the principal switch processes the "normal" RDI message, at 306. If the message does include a trigger value indicating an RRDI, however, the principal switch proceeds to process perform operations 308 and 310.

Figure 4A:
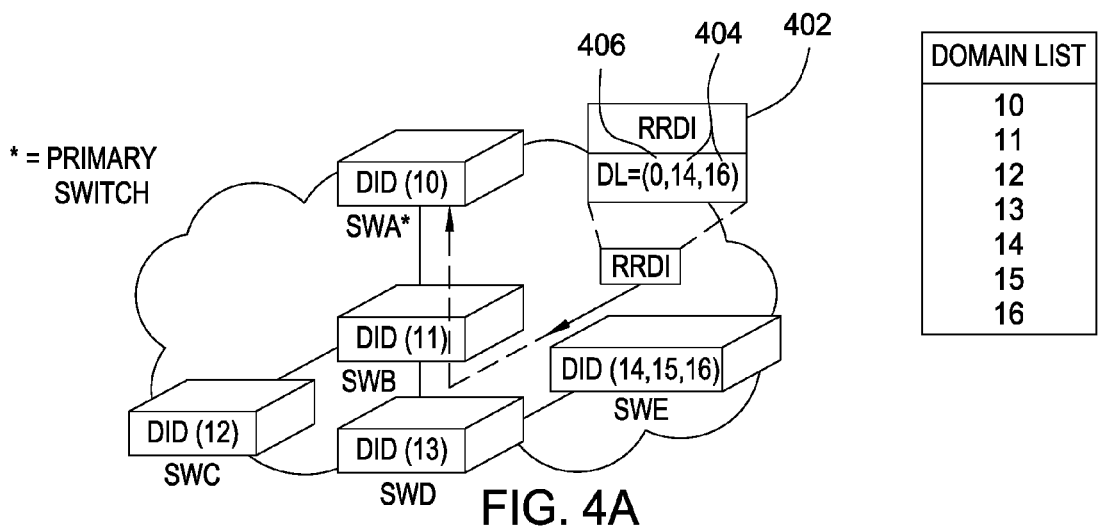
FIGS. 4A-4D illustrate different stages of returning domain IDs in accordance with embodiments of the present disclosure.

As illustrated in FIG. 4A, Switch E may send an RRDI message 402 towards the principal Switch A. The RRDI message may take the form of an RDI message that includes a trigger value 406 indicating a list 404 of one or more Domain_IDs to be removed follows. In this example, a trigger value of "0" indicates Switch E is requesting removal of the Domain IDs 14 and 16 that follow.

Figure 4B:
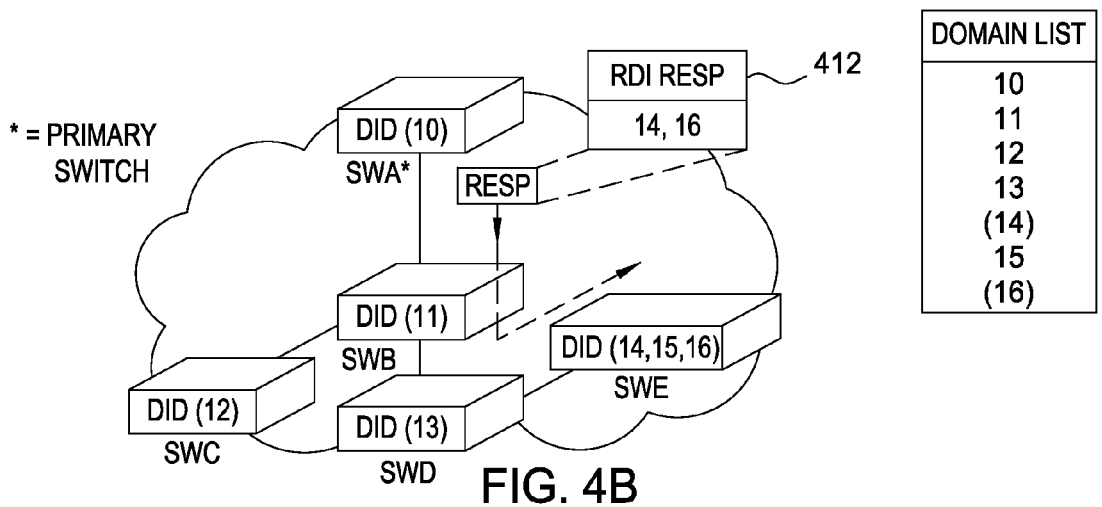

At 308, the principal switch sends an RRDI response to the requesting switch. As illustrated in FIG. 4B, principal switch A may send an RRDI response message 412 that includes the Domain_IDs to be removed. Depending on the implementation, the RRDI response may be the same as a standard RDI response and may or may not also include the trigger value.

Figure 4C:
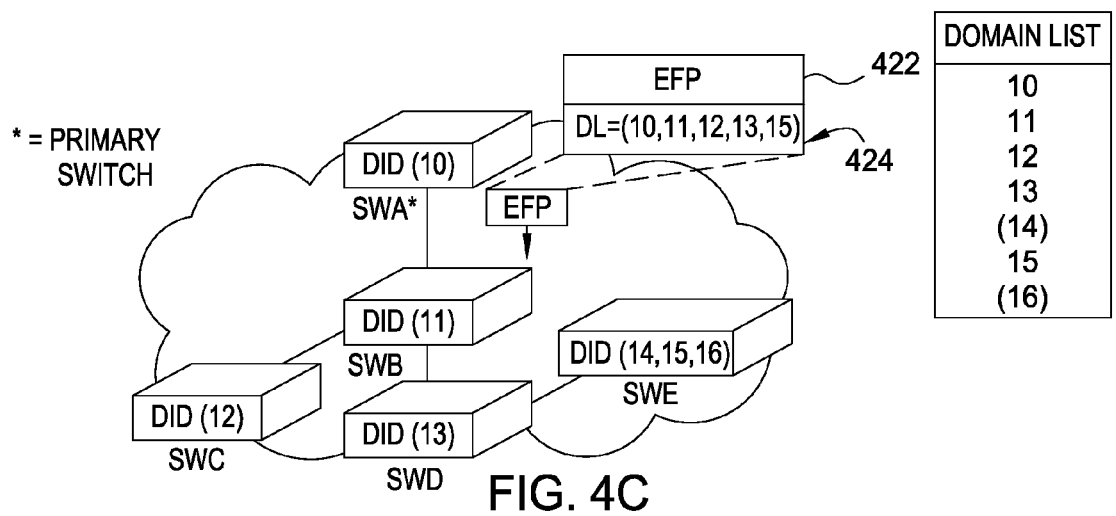
Figure 4D:
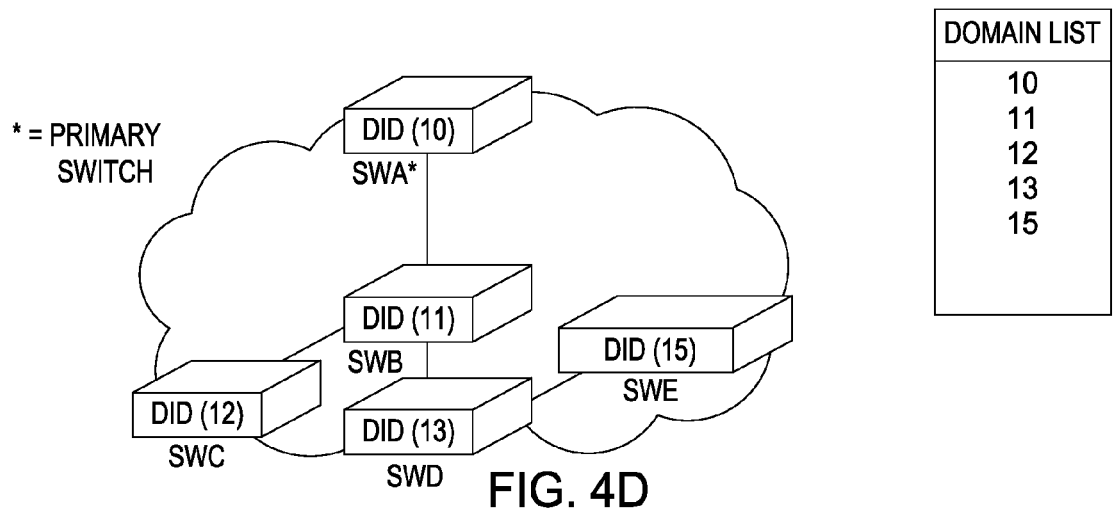

At 310, the principal switch may send an updated Domain_ID list to the other switches in the fabric. As illustrated in FIG. 4C, principal switch A may send an EFP update frame 422 with a reduced list 424 of fabric Domain_IDs to all the switches in the fabric. As illustrated in FIG. 4D, upon receipt of the EFP update frame 422, each switch may extract the new Domain ID list 424 and update their local copy of the fabric Domain ID list 120 accordingly.

Whether a device operates as a principal switch or a subordinate switch may depend on the results of a build fabric (BF) phase. Because a device may operate as either, for some embodiments, a single device may support the return of Domain_IDs when acting as either a principal switch or subordinate switch. In other words, the device may perform operations such as those shown in FIG. 3 when operating as a principal switch and perform operations such as those shown in FIG. 2 when operating as a subordinate switch.

Interoperability

As described above, in the event that a subordinate switch does not receive a response to an RRDI message requesting removal of Domain_IDs, the Domain_IDs may still be returned through a conventional reconfiguration process. This scenario is illustrated in FIGS. 5A-5C.

Figure 5A:
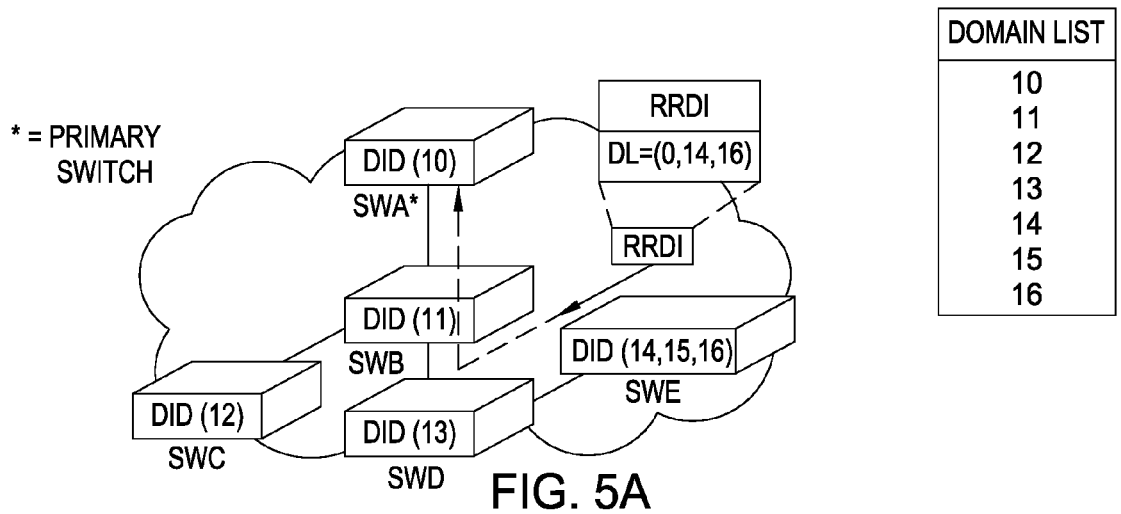
FIGS. 5A-5C illustrate the interoperability of switches that support reverse RDI messages and switches that do not support reverse RDI messages IDs in accordance with embodiments of the present disclosure.
Figure 5B:
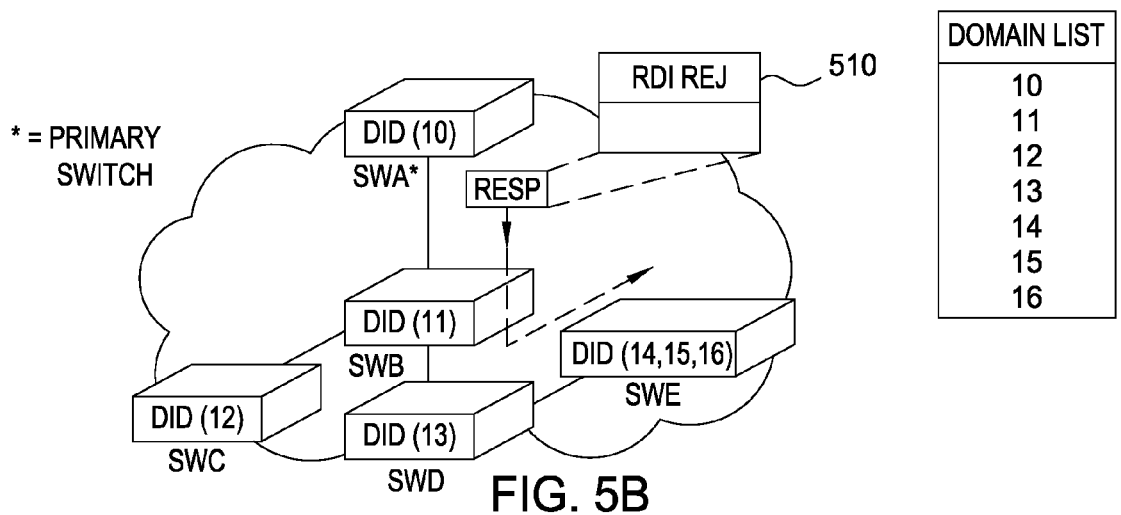
Figure 5C:
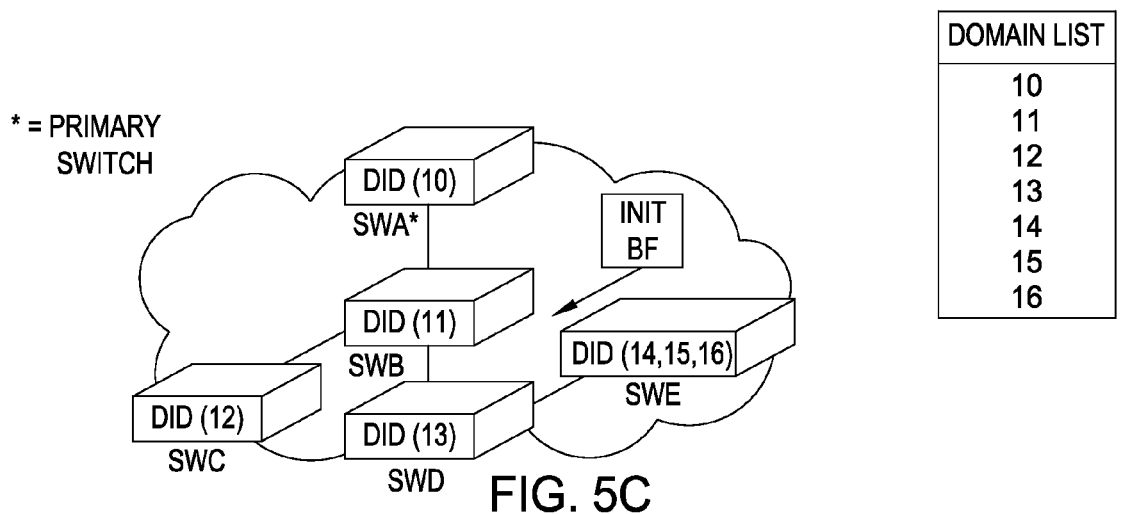

In FIG. 5A, switch E sends an RRDI message requesting removal of Domain_IDs 14 and 16. The example assumes that principal switch A does not support RRDIs. As illustrated in FIG. 5B, principal switch A may simply treat the RRDI message (with an invalid Domain_ID as a trigger value) as a non-well-formatted RDI message frame and return an RDI reject message 510. As illustrated in FIG. 5C, switch E may interpret the RDI reject message 510 as an indication that master switch A does not support RRDI message and that it needs to initiate a standard BF phase.

As the preceding example illustrates, switches that support Domain_ID removal without reconfiguration may be interoperable with switches that do not support Domain_ID removal. This may have a significant effect in the market place, as this results in inter-operability between devices that support this feature and devices that do not. In other words, each device in a network does not need to be replaced if a single device supporting the feature is added.

In the event a principal switch does not support Domain_ID removal, a conventional reconfiguration process may occur. In other words, if a device that supports the feature is added to other devices that do not, the device may continue to operate in a conventional manner, in essence, with the time required to return Domain_IDs regressing to that of a conventional BF phase.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for returning a set of one or more domain identifiers without a build fabric phase in a network fabric, comprising:

sending a message to a principal switch of the fabric requesting the domain identifiers to be returned from a switch in the network fabric, wherein the message conforms to a message format for requesting the domain identifiers to be assigned and includes an invalid domain identifier;

receiving, from the principal switch, a response to the message;

upon determining, based on the response indicating that the message contains the invalid domain identifier, that the principal switch does not support returning domain identifiers without a build fabric phase, initiating a build fabric phase to effect removal of the domain identifiers; and upon determining, based on at least one of the response acknowledging the message and the response including an updated list of fabric identifiers reflecting removal of the domain identifiers, that the principal switch supports returning domain identifiers without a build fabric phase, updating a local list of fabric identifiers based on the updated list of fabric identifiers to effect removal of the domain identifiers without a build fabric phrase.

2. The computer-implemented method of claim 1, further comprising:

determining a set of one or more domain identifiers assigned to the switch in the network fabric when the switch joined the network fabric, wherein each of the set of one or more domain identifiers uniquely identifies the switch relative to other switches in the network fabric.

3. The computer-implemented method of claim 1-2, further comprising:

composing the message to de-assign the set of one or more domain identifiers from the switch in the network fabric, wherein the message is composed according to a predefined format of a request domain identifier (RDI) message configured to request one or more domain identifiers to be assigned to the switch.

4. The computer-implemented method of claim 3, wherein the predefined format specifies a valid range of domain identifiers, wherein the message specifies the set of one or more domain identifiers, wherein the set of one or more domain identifiers is within the valid range.

5. The computer-implemented method of claim 4, wherein the message further specifies a trigger value outside of the valid range, wherein the RDI message is characterized by absence of the trigger value, wherein presence of the trigger value in the message indicates that the message is a reverse request domain identifier (RRDI) message configured to request the set of one or more domain identifiers to be de-assigned from the switch.

6. The computer-implemented method of claim 1, wherein the domain identifiers are rendered available for reassignment to other switches in the network fabric, and wherein a build fabric phase includes reconfiguring one or more switches in the network fabric by flooding the network fabric with build fabric frames.

7. The computer-implemented method of claim 1, wherein the network fabric is part of a virtual storage area network (VSAN), wherein the domain identifiers comprise one or more virtual identifiers, and wherein the fabric comprises a Fibre Channel fabric.

8. A non-transitory computer readable medium containing a program which, when executed by one or more computer processors, performs an operation for returning a set of one or more domain identifiers without a build fabric phase in a network fabric, the operation comprising:

sending a message to a principal switch of the fabric requesting the domain identifiers to be returned from a switch in the network fabric, wherein the message conforms to a message format for requesting the domain identifiers to be assigned and includes an invalid domain identifier;

receiving, from the principal switch, a response to the message;

upon determining, based on the response indicating that the message contains the invalid domain identifier, that the principal switch does not support returning domain identifiers without a build fabric phase, initiating a build fabric phase to effect removal of the domain identifiers; and upon determining, based on at least one of the response acknowledging the message and the response including an updated list of fabric identifiers reflecting removal of the domain identifiers, that the principal switch supports returning domain identifiers without a build fabric phase, updating a local list of fabric identifiers based on the updated list of fabric identifiers to effect removal of the domain identifiers without a build fabric phrase.

9. The non-transitory computer readable medium of claim 8, wherein the operation further comprises:

determining a set of one or more domain identifiers assigned to the switch in the network fabric when the switch joined the network fabric, wherein each of the set of one or more domain identifiers uniquely identifies the switch relative to other switches in the network fabric.

10. The non-transitory computer readable medium of claim 9, wherein the operation further comprises:

composing the message to de-assign the set of one or more domain identifiers from the switch in the network fabric, wherein the message is composed according to a predefined format of a request domain identifier (RDI) message configured to request one or more domain identifiers to be assigned to the switch.

11. The non-transitory computer readable medium of claim 10, wherein the predefined format specifies a valid range of domain identifiers, wherein the message specifies the set of one or more domain identifiers, wherein the set of one or more domain identifiers is within the valid range.

12. The non-transitory computer readable medium of claim 11, wherein the message further specifies a trigger value outside of the valid range, wherein the RDI message is characterized by absence of the trigger value, wherein presence of the trigger value in the message indicates that the message is a reverse request domain identifier (RRDI) message configured to request the set of one or more domain identifiers to be de-assigned from the switch.

13. The non-transitory computer readable medium of claim 8, wherein the domain identifiers are rendered available for reassignment to other switches in the network fabric, and wherein a build fabric phase includes reconfiguring one or more switches in the network fabric by flooding the network fabric with build fabric frames.

14. The non-transitory computer readable medium of claim 8, wherein the network fabric is part of a virtual storage area network (VSAN), wherein the domain identifiers comprise one or more virtual identifiers, and wherein the fabric comprises a Fibre Channel fabric.

15. A system comprising:

one or more computer processors;

a memory containing a program which, when executed by the one or more computer processors, performs an operation for returning a set of one or more domain identifiers without a build fabric phase in a network fabric, the operation comprising:

sending a message to a principal switch of the fabric requesting the domain identifiers to be returned from a switch in the network fabric, wherein the message conforms to a message format for requesting the domain identifiers to be assigned and includes an invalid domain identifier;

receiving, from the principal switch, a response to the message;

upon determining, based on the response indicating that the message contains the invalid domain identifier, that the principal switch does not support returning domain identifiers without a build fabric phase, initiating a build fabric phase to effect removal of the domain identifiers; and upon determining, based on at least one of the response acknowledging the message and the response including an updated list of fabric identifiers reflecting removal of the domain identifiers, that the principal switch supports returning domain identifiers without a build fabric phase, updating a local list of fabric identifiers based on the updated list of fabric identifiers to effect removal of the domain identifiers without a build fabric phrase.

16. The system of claim 15, wherein the operation further comprises:

determining a set of one or more domain identifiers assigned to the switch in the network fabric when the switch joined the network fabric, wherein each of the set of one or more domain identifiers uniquely identifies the switch relative to other switches in the network fabric.

17. The system of claim 16, wherein the operation further comprises:

composing the message to de-assign the set of one or more domain identifiers from the switch in the network fabric, wherein the message is composed according to a predefined format of a request domain identifier (RDI) message configured to request one or more domain identifiers to be assigned to the switch.

18. The system of claim 17, wherein the predefined format specifies a valid range of domain identifiers, wherein the message specifies the set of one or more domain identifiers, wherein the set of one or more domain identifiers is within the valid range.

19. The system of claim 18, wherein the message further specifies a trigger value outside of the valid range, wherein the RDI message is characterized by absence of the trigger value, wherein presence of the trigger value in the message indicates that the message is a reverse request domain identifier (RRDI) message configured to request the set of one or more domain identifiers to be de-assigned from the switch.

20. The system of claim 15, wherein the domain identifiers are rendered available for reassignment to other switches in the network fabric, and wherein a build fabric phase includes reconfiguring one or more switches in the network fabric by flooding the network fabric with build fabric frames.

\* \* \* \* \*